(12) United States Patent
Uemura et al.

(10) Patent No.: US 10,883,602 B2
(45) Date of Patent: Jan. 5, 2021

(54) METAL SEAL, FLUID CONTROL APPARATUS, AND SEALING METHOD

(71) Applicants: Kumamoto Prefecture, Kumamoto (JP); HORIBA STEC, Co., Ltd., Kyoto (JP)

(72) Inventors: Makoto Uemura, Kumamoto (JP); Hiroki Miyaji, Kyoto (JP)

(73) Assignees: KUMAMOTO PREFECTURE, Kumamoto (JP); HORIBA STEC, CO., LTD., Kyoto (JP)

( * ) Notice: Subject to any disclaimer, the term of this patent is extended or adjusted under 35 U.S.C. 154(b) by 116 days.

(21) Appl. No.: 16/201,939

(22) Filed: Nov. 27, 2018

(65) Prior Publication Data

US 2019/0162305 A1    May 30, 2019

(30) Foreign Application Priority Data

Nov. 28, 2017  (JP) ................................ 2017-228200

(51) Int. Cl.
*F16J 15/02* (2006.01)
*F16J 15/08* (2006.01)

(52) U.S. Cl.
CPC ........... *F16J 15/02* (2013.01); *F16J 15/0881* (2013.01)

(58) Field of Classification Search
CPC .... F16J 15/00; F16J 15/02; F16J 15/46; F16J 15/48; F16J 15/08; F16J 15/0881
USPC ....................................................... 277/314
See application file for complete search history.

(56) References Cited

U.S. PATENT DOCUMENTS

| | | | | |
|---|---|---|---|---|
| 7,083,171 | B2* | 8/2006 | Oida | F16J 15/0881 277/626 |
| 10,415,729 | B2* | 9/2019 | Stobbart | F16L 23/20 |
| 2003/0107188 | A1* | 6/2003 | Spence | F16J 15/0887 277/644 |
| 2004/0188956 | A1* | 9/2004 | Shibata | F16J 15/0881 277/647 |
| 2014/0167366 | A1* | 6/2014 | Yasuda | F16J 15/0818 277/637 |

FOREIGN PATENT DOCUMENTS

JP    4299581 B2    7/2009

* cited by examiner

*Primary Examiner* — Nathan Cumar
(74) *Attorney, Agent, or Firm* — Alleman Hall Creasman & Tuttle LLP

(57) ABSTRACT

A metal seal is annular, provided sandwiched between first and second flat surfaces. The seal includes a first/second end surface opposite to the first/second flat surface, respectively. The first end surface includes paired first protrusions formed displaced in a radial direction of the metal seal and have dihedral angles contacting the first flat surface, and the second end surface includes a second protrusion formed inward of one first protrusion and outward of the other first protrusion in the radial direction, and has a dihedral angle contacting the second flat surface, and paired third protrusions that are respectively formed inward and outward of the second protrusion and whose highest points to which perpendicular distances from a reference plane including the dihedral angles of the paired first protrusions are shorter than a perpendicular distance from the reference plane to the dihedral angle of the second protrusion.

9 Claims, 8 Drawing Sheets

METAL SEAL, FLUID CONTROL APPARATUS, AND SEALING METHOD

TECHNICAL FIELD

The present invention relates to a metal seal, a fluid control apparatus, and a sealing method.

BACKGROUND ART

In fluid control equipment such as mass flow controllers, when connecting the flange of a valve, a flow rate sensor, or the like to a block formed with an internal flow path, between the mutually opposite flat surfaces of the block and the flange, a metal seal for sealing a gap formed between the two flat surfaces is provided.

As such a conventional metal seal, Patent Literature 1 discloses a metal seal 100 that as illustrated in FIGS. 6 and 7, includes: an intermediate base part M whose cross-sectional shape along the radial direction of the metal seal 100A is a substantially rectangular shape in a natural state before deformation; a semicircular-shaped first convex part 11A and a first edge part 12A, which on the upper surface of the intermediate base part M, protrude upward on the inner and outer sides in the radial direction, respectively; and a semicircular-shaped second convex part 21A and a second edge part 22A, which on the lower surface of the intermediate base part M, protrude downward on the inner and outer sides in the radial direction, respectively.

When sealing a gap formed between two flat surfaces S1 and S2 by the metal seal 100A disclosed in Patent Literature 1, the metal seal 100A is first arranged between the two flat surfaces S1 and S2, and both the surfaces S1 and S2 are brought close to each other. In doing so, the metal seal 100A comes into a first state where as illustrated in FIG. 7 at (a), the first flat surface S1 and the first convex part 11A are only in contact with each other, and the second flat surface S2 and the second convex part 21A are only in contact with each other. Then, when further bringing both the flat surfaces S1 and S2 close to each other, as illustrated in FIG. 7 at (b), the first convex part 11A and the second convex part 21A are respectively pressed in the up-down direction to cause torsional elastic deformation around the intermediate base part M (the center of gravity) in the metal seal 100A. As a result, the metal seal comes into a second state where the first edge part 12A is in contact with the first flat surface S1, and also the second edge part 22A is in contact with the second flat surface S2.

The metal seal 100A allows appropriate contact pressure to be achieved at each of the contact points of the metal seal 100A with the two flat surfaces S1 and S2. Accordingly, it is considered that damage is unlikely to occur to the two flat surfaces S1 and S2, and therefore leakage can be prevented from occurring.

However, practically, even when the metal seal 100A is used, fluid leakage may occur. As a result of intensively examining the cause of the fluid leakage, the present inventors have first found the presence of the following multiple problems.

That is, when the metal seal 100 transitions from the first state to the second state, it attempts to extend both inward and outward. At this time, since the volume itself of the metal seal 100A cannot be significantly changed, the first convex part 11A slips inward in the radial direction on the first flat surface S1, and the second concave part 21A slips outward in the radial direction on the second flat surface S2. As a result, fine scratches are produced on the first flat surface S1 and the second flat surface S2 by slipping of the metal seal 100A, and thereby unsealable points are produced.

Also, when large torsional elastic deformation occurs during the transition from the first state to the second state as in the metal seal 100A, fine wrinkles are produced on the first convex part 11A in the circumferential direction as illustrated in FIG. 8(a) because metal is concentrated inward of the annular metal seal 100A. As a result, as illustrated in FIG. 8(b), contact points and non-contact points are produced between the first concave part 11A and the first flat surface S1 to cause nonuniform contact, and therefore there is a possibility that the metal seal 100A cannot come into an intended pressed state.

CITATION LIST

Patent Literatures

Patent Literature 1: Japanese Patent No. 4299581

SUMMARY OF INVENTION

Technical Problem

Therefore, the main object of the present invention is to provide a metal seal that can prevent fine scratches from being easily produced on a first flat surface and a second flat surface by slipping of the metal seal and has high close contact performance with the first flat surface and the second flat surface.

Solution to Problem

That is, the metal seal according to the present invention is one that is annular, provided between a first flat surface and a second flat surface, and sandwiched pressed by bringing the first flat surface and the second flat surface close to each other, and includes: a first end surface part opposite to the first flat surface; and a second end surface part opposite to the second flat surface. In addition, the first end surface part includes paired first protrusions that are formed displaced in the radial direction of the metal seal and have dihedral angles in contact with the first flat surface. Further, the second end surface part includes: a second protrusion that is formed on the inner side of one of the first protrusions and on the outer side of the other first protrusion in the radial direction, and has a dihedral angle in contact with the second flat surface; and paired third protrusions that are respectively formed on the inner side and the outer side of the second protrusion in the radial direction and whose highest points to which distances from a reference plane including the dihedral angles of the paired first protrusions in a direction perpendicular to the reference plane are shorter than a distance from the reference plane to the dihedral angle of the second protrusion in the direction perpendicular to the reference plane.

In such a configuration, when bringing the first flat surface and the second flat surface close to each other, the metal seal comes into a first state where the dihedral angles of the paired first protrusions are in contact with the first flat surface in a state of biting, and also the dihedral angle of the second protrusion is in contact with the second flat surface in a state of biting. In addition, when viewing a cross section along the radial direction of the metal seal in the first state, a three-point support state is established between the first flat surface and the second flat surface, and then even when further bringing the first flat surface and the second flat surface close to each other to press the metal seal, the metal seal can be prevented from being torsionally deformed to fall inward and outward in the radial direction. Also, when further pressing the metal seal to deform it after coming into the first state, the metal seal comes into a second state where not only the second protrusion but the paired third protrusions are in contact with the second flat surface. Then, when further bringing the first flat surface and the second flat surface close to each other to press the metal seal after coming into the second state, the paired first protrusions shallowly biting into the flat surface as compared with the second protrusion in the first state are strongly pressed by the second flat surface in contact with the paired third protrusions and consequently deeply bite into the first flat surface. As a result, not only the second protrusion, but the paired first protrusions also deeply bite into the opposite flat surface, and therefore the metal seal is more unlikely to be displaced with respect to the first flat surface and the second flat surface, thus improving sealability. Also, in this case, torsional elastic deformation is unlikely to occur in the metal seal, and thereby wrinkles are also unlikely to be produced. As a result, the metal seal can be brought into close contact with the first flat surface and the second flat surface along the circumferential direction, and thereby sealability can be improved. In addition, a dihedral angle refers to angle formed by two slopes, and a slope may be a flat surface or a curved surface curved to some extent. Incidentally, the dihedral angle of each protrusion is of a horn shape in a natural state where the metal seal is not pressed by the respective flat surfaces and unused. However, when the metal seal is pressed by the respective flat surfaces and used, the horn is crushed, and the tip thereof may be deformed into a shape that is not a horn shape, such as a flat shape or an arc shape.

Also, when the metal seal is sandwiched pressed and deformed by the first flat surface and the second flat surface, the paired third protrusions may be ones that contact with the second flat surface. Further, when the metal seal is sandwiched pressed and deformed by the first flat surface and the second flat surface, one of the third protrusions may be one that contacts with the second flat surface on the outer side of the one first protrusion in the radial direction, and the other third protrusion may be one that contacts with the second flat surface on the inner side of the other first protrusion in the radial direction.

In such a configuration, when further bringing the first flat surface and the second flat surface close to each other to press the metal seal after coming into the second state, compressive force acts on the paired first protrusions to move them in directions facing each other. However, no matter how strong the compressive force acts on the paired first protrusions, the metal seal itself can be deformed to some extent, and therefore the movements of the paired first protrusions in the directions facing each other are blocked. This prevents the first protrusions from easily slipping on the first flat surface, thus improving sealability. Also, since the positions of the respective protrusions in the radial direction are different between the first end surface part and the second end surface part, by using the metal seal upside down, the same metal seal can be used for resealing. When going into detail, first sealing forms scratches at the contact positions of the respective protrusions with the first flat surface and the second flat surface. However, by using the metal seal upside down for second sealing, the respective protrusions can be brought into contact with corresponding ones of the first flat surface and the second flat surface while avoiding the scratches, and therefore even after the second sealing, the same airtightness as the first sealing can be kept.

In addition, in any of the above metal seals, at least ones of the paired first protrusions and the paired third protrusions may be ones that extend in the direction perpendicular to the reference plane, and are line-symmetrically formed with respect to a centerline passing through the dihedral angle of the second protrusion.

In such a configuration, for example, when line-symmetrically forming the paired first protrusions with respect to the centerline, in the first state, pressing force by the second flat surface substantially uniformly transmits to the respective first protrusions via the second protrusion, and thereby the biting depths of the dihedral angles of the respective first protrusions into the first flat surface are substantially uniformed. As a result, a situation where the biting depth of the dihedral angle of one first protrusion into the first flat surface is shallows is avoided, and thereby the paired first protrusions can be suppressed from slipping on the first flat surface. On the other hand, when line-symmetrically forming the paired third protrusions with respect to the centerline, in the second state, pressing force by the first flat surface uniformly transmits to the respective third protrusions via the respective first protrusions, and thereby the contact pressures of the respective third protrusions on the second flat surface are substantially uniformed. As a result, a situation where the contact pressure of one third protrusion on the second flat surface is low is avoided, and thereby the paired third protrusions can be suppressed from slipping on the second flat surface. Further, when line-symmetrically forming both the paired first protrusions and the paired third protrusions with respect to the centerline, imbalances in external force and stress acting on the metal seal between both sides (inner side and outer side) of the centerline can be eliminated, and as a result, the paired first protrusions and the paired third protrusions can be further suppressed from slipping on corresponding ones of the contact flat surfaces.

Further, in any of the above metal seals, the paired third protrusions may be ones that have dihedral angles to be in contact with the second flat surface.

In such a configuration, in the second state, the paired third protrusions are in contact with the second flat surface in a state of biting, and as a result, the paired third protrusions can be suppressed from slipping on the second flat surface.

Still further, the dihedral angles of the paired third protrusions are ones formed so as to have the same distance from the reference plane in the direction perpendicular to the reference plane.

In such a configuration, during the transition from the first state to the second state, the respective third protrusions contact with the second flat surface at substantially the same time, and along with this, the biting depths of the respective third protrusions into the second flat surface are substantially uniformed. As a result, one third protrusion can be prevented from shallowly biting into the second flat surface, and the paired third protrusions can be suppressed from slipping on the second flat surface.

In addition, the fluid control apparatus according to the present invention is one including: any of the above metal seals; a flange formed with the first flat surface; and a block formed with the second flat surface, in which the metal seal is configured to be sandwiched pressed by the first flat surface and the second flat surface by mounting the flange on the block.

In such a configuration, sealability against a gap formed between the block and the flange can be improved, and thereby fluid leakage from the gap can be suppressed.

Also, the metal seal according to the present invention is one that is annular and includes a first end surface part and a second end surface part. In addition, the first end surface part includes paired first protrusions that are formed displaced in a radial direction of the metal seal and have dihedral angles, and the second end surface part includes: a second protrusion that is formed on the inner side of one of the first protrusions and on the outer side of the other first protrusion in the radial direction, and has a dihedral angle; and paired third protrusions that are respectively formed on the inner side and the outer side of the second protrusion in the radial direction and whose highest points to which distances from a reference plane including the dihedral angles of the paired first protrusions in a direction perpendicular to the reference plane are shorter than a distance from the reference plane to the dihedral angle of the second protrusion in the direction perpendicular to the reference plane.

Further, the sealing method according to the present invention is one using a metal seal that is annular and includes a first end surface part including paired first protrusions having dihedral angles and a second end surface part including a second protrusion having a dihedral angle and paired third protrusions having ridge lines. In addition, the sealing method includes: bringing the dihedral angles of the paired first protrusions into contact with a first flat surface, as well as bringing the dihedral angle of the second protrusion into contact with a second flat surface; and bringing the ridge lines of the paired third protrusions into contact with the second flat surface by sandwiching, pressing, and deforming the metal seal by the first flat surface and the second flat surface.

Advantageous Effects of Invention

According to the present invention configured as described above, a metal seal that can prevent fine scratches from being easily produced on a first flat surface and a second flat surface by slipping of the metal seal, and has high close contact performance with the first flat surface and the second flat surface can be obtained.

DESCRIPTION OF EMBODIMENTS

In the following, the metal seal according to the present invention will be described on the basis of the drawings.

First Embodiment

Figure 1:
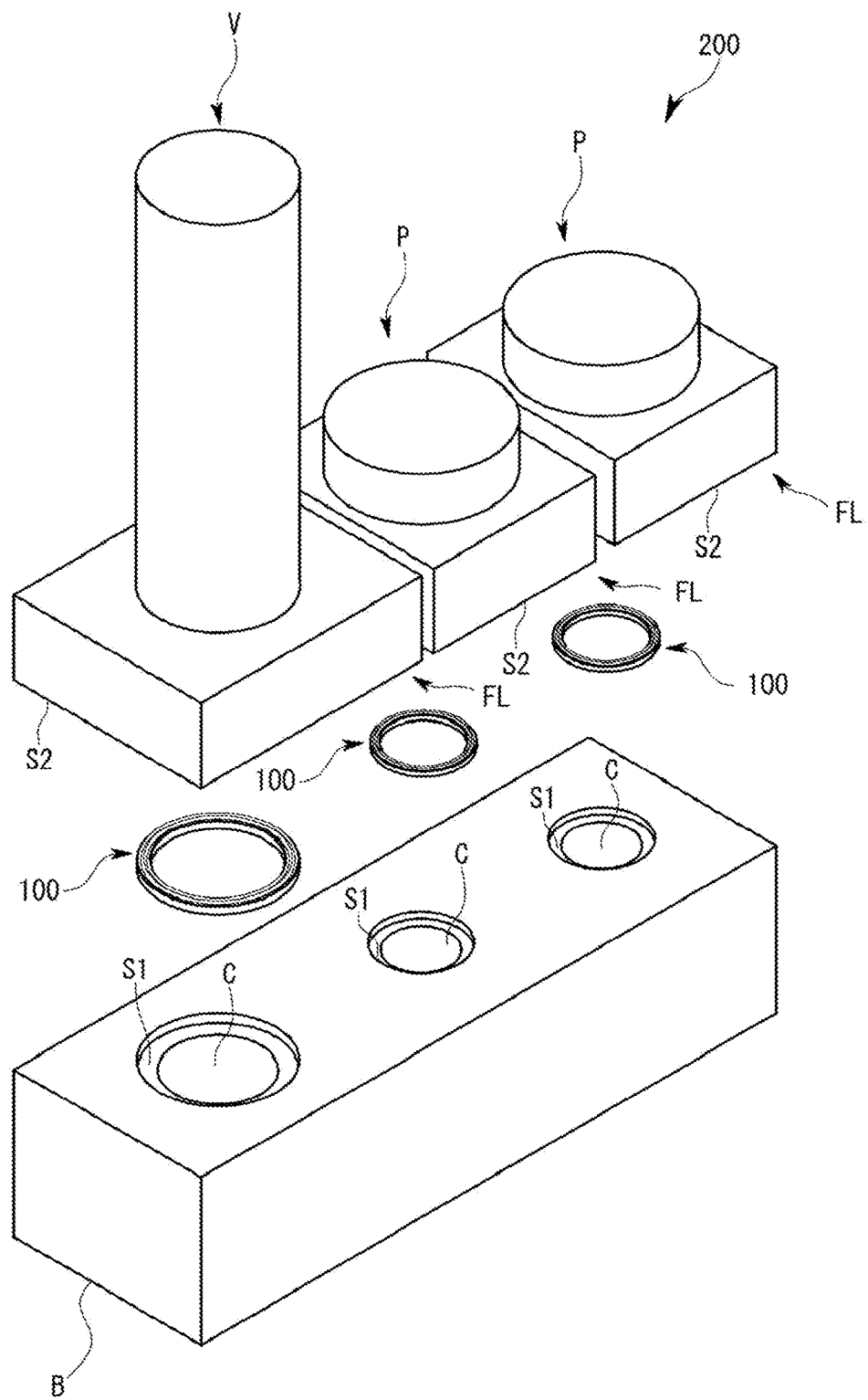
FIG. 1 is a schematic exploded perspective view illustrating metal seals and a mass flow controller using the metal seals according to a first embodiment.

As illustrated in FIG. 1, a metal seal 100 according to the present embodiment is used to prevent fluid leakage from the connecting part between adjacent members in, for example, a mass flow controller 200 as a fluid control apparatus.

To describe specifically, the mass flow controller 200 is one including: a block B formed with an internal flow path; a valve V mounted on the block B, and two pressure sensors P also mounted on the block B.

The block B is of a substantially rectangular parallelepiped shape, and in the upper surface thereof serving as a mounting surface for the valve V and two pressure sensors P, multiple openings C connecting to the internal flow path are provided. In addition, the valve V and the two pressure sensors P are fixed on the mounting surface of the block B by bolts or the like via mounting flanges FL. Further, metal seals 100 are arranged so as to surround the openings C provided in the mounting surface of the block B, and sandwiched between the mounting surface and the bottom surfaces of the mounting flanges FL.

To described more specifically, on the mounting surface of the block B, annular-shaped first flat surfaces S1 to be in contact with the metal seals 100 are formed around the respective openings C. Also, on the bottom surfaces of the mounting flanges FL for the valve V and two pressure sensors P, second flat surfaces S2 to be in contact with the metal seals 100 are formed. In addition, the metal seals 100 are sandwiched between the first flat surfaces S1 and corresponding ones of the second flat surfaces S2, and pressed by bringing the first flat surfaces S1 and corresponding ones of the second flat surfaces S2 close to each other. Note that in the present embodiment, for convenience of description, the upper surface side in FIG. 1 corresponding to the first flat surfaces S1 and the lower surface side corresponds to the second flat surfaces S2; however, this relationship may be reversed.

Figure 2:
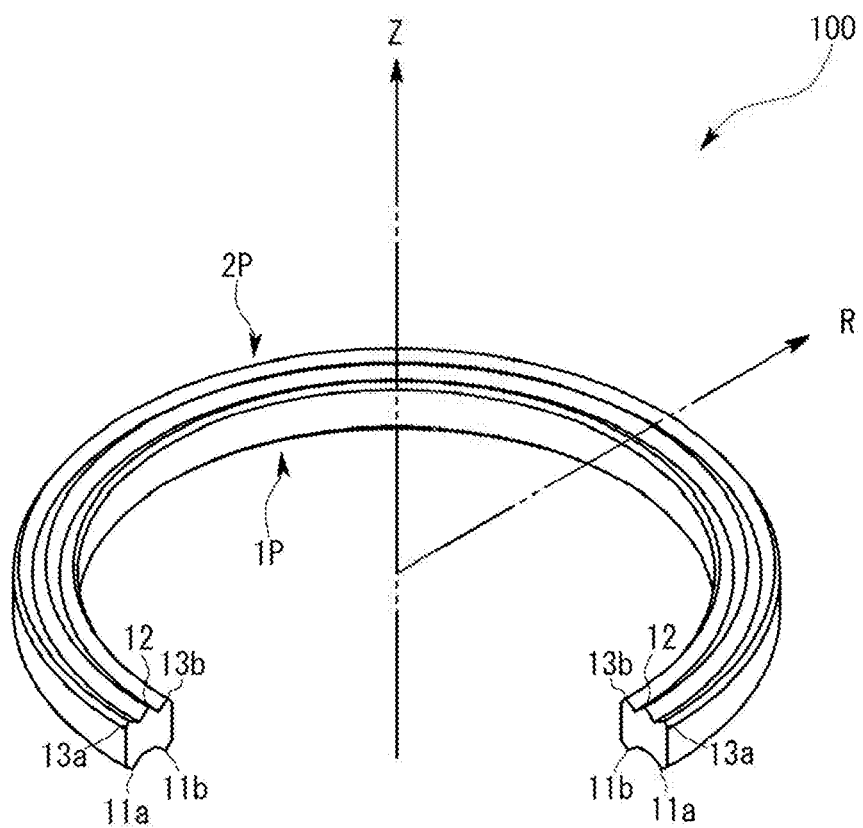
FIG. 2 is a schematic perspective view of each metal seal according to the first embodiment.
Figure 3:
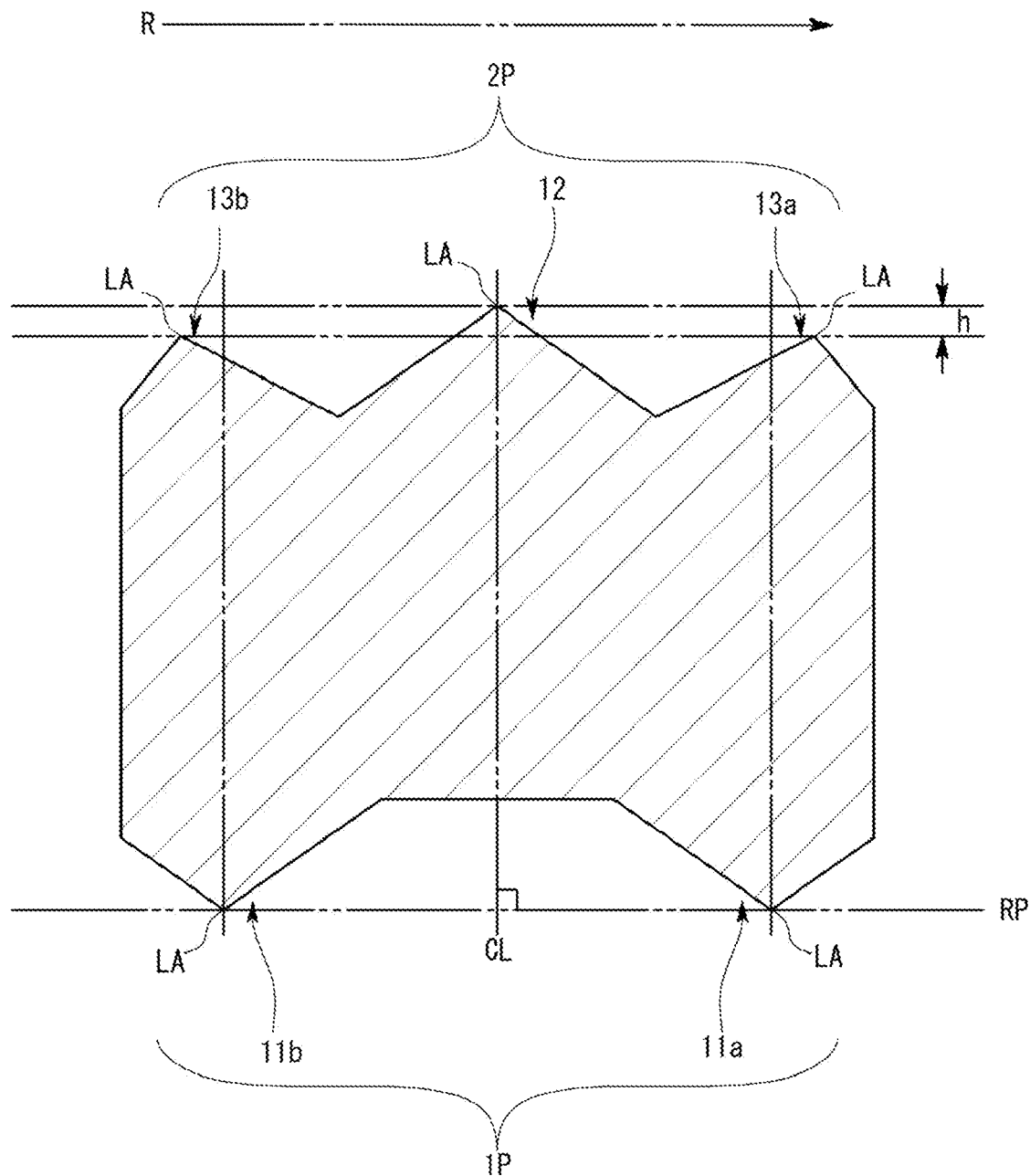
FIG. 3 is a schematic cross-sectional view illustrating a cross section along the radial direction of the metal seal according to the first embodiment.

Next, when going into detail about the metal seal 100, assuming the cylindrical coordinate system as illustrated in FIG. 2, the metal seal 100 is formed in a rotating body shape obtained by arranging the cross section thereof illustrated in FIG. 3 in a position separated from the central axis Z in the radial direction R by a predetermined distance, and rotating the cross section around the central axis Z once. More specifically, the metal seal 100 includes: a first end face part 1P opposite to the first flat surface S1 and a second end surface part 2P opposite to the second flat surface S2. In addition, the first end surface part 1P is formed with two protrusion parts, and the second end surface part 2P is formed with three protrusion parts. Note that the first end surface part 1P and the second end surface part 2P are formed in predetermined shapes by machining such as cutting work; however, another processing method may be used for the formation. In addition, the following description will be given as well with a rotation axis passing through the center when viewing the metal seal 100 from a direction perpendicular to the first end surface part 1P or the second end surface part 2P as the central axis Z and a direction perpendicular to the central axis Z as the radial direction R.

As illustrated in FIG. 2, the first end surface part 1P includes paired first protrusions 11a and 11b formed displaced in the radial direction R. Specifically, the first end surface part 1P includes: one first protrusion 11a formed on the outer side in the radial direction R; and the other first protrusion 11b formed on the inner side in the radial direction R.

As illustrated in FIG. 3, each of the first protrusions 11a and 11b is one whose cross-section along the radial direction R is of an isosceles triangular shape. Accordingly, each of the first protrusions 11a and 11b forms a dihedral angle LA making a circle on the first end surface part 1P. In other word, the first protrusions 11a and 11b are circle shaped ridges and ridge lines of the first protrusions 11a and 11b are in contact with the first flat surface S1. In addition, the dihedral angle LA of each of the first protrusions 11a and 11b is formed to be at least smaller than 180° and preferably to be 110°±1°, and the outer slope and the inner slope are adapted to slope at the same angle with respect to the first flat surface S1.

As illustrated in FIG. 2, the second end surface part 2P includes: a second protrusion 12; and paired third protrusions 13a and 13b respectively formed on the inner and outer sides of the second protrusion 12 in the radial direction R. Specifically, the second end surface part 2P includes: the second protrusion 12; one third protrusion 13a formed on the outer side of the second protrusion 12 in the radial direction R; and the other third protrusion 13b formed on the inner side of the second protrusion 12 in the radial direction R.

The second protrusion 12 is one whose cross section along the radial direction R is of a substantially triangular shape. Accordingly, the second protrusion 12 forms a dihedral angle LA making a circle on the second end surface part 2P. In other word, the second protrusions 12 is a circle shaped ridge and a ridge line of the second protrusion 12 is in contact with the second flat surface S2. In addition, the dihedral angle LA of the second protrusion 12 is formed so as to be positioned on the inner side of the dihedral angle LA of the one first protrusion 11a and on the outer side of the dihedral angle LA of the other first protrusion 11b in the radial direction R. More specifically, the dihedral angle LA of the second protrusion 12 is formed so as to be positioned at the center between the dihedral angle LA of the one first protrusion 11a and the dihedral angle LA of the other first protrusion 11b in the radial direction R. In addition, the dihedral angle LA of the second protrusions 12 is formed to be at least smaller than 180° and preferably to be 110°±1°, and the outer slope and the inner slope are adapted to slope at the same angle with respect to the second flat surface S2.

Each of the third protrusions 13a and 13b is one whose cross section along the radial direction R is of a substantially triangular shape. Accordingly, each of the third protrusions 13a and 13b forms a dihedral angle LA making a circle on the second end surface part 2P. In other word, the third protrusions 13a and 13b are circle shaped ridges and ridge lines of the third protrusions 13a and 13b are in contact with the second flat surface S2. In addition, the dihedral angle LA of one third protrusion 13a is formed so as to be positioned on the outer side of the dihedral angle LA of the one first protrusion 11a in the radial direction R, and the dihedral angle LA of the other third protrusion 13b is formed so as to be positioned on the inner side of the dihedral angle LA of the other first protrusion 11b in the radial direction R. More specifically, the dihedral angle LA of the one third protrusion 13a is formed so as to be positioned on the outer side of the dihedral angle LA of the one first protrusion 11a in the radial direction R by a predetermined distance, and the dihedral angle LA of the other third protrusion 13a is formed so as to be positioned on the inner side of the dihedral angle LA of the other first protrusion 11b in the radial direction R by the same distance as the predetermined distance. In addition, the dihedral angle LA of each of the third protrusions 13a and 13b is formed to be at least smaller than 180° and preferably to be 110°±1°, and the inner slope is adapted to slope at a smaller angle than the outer slope with respect to the second flat surface S2.

Also, as illustrated in FIG. 3, in a natural state before deformation of the metal seal 100, a distance from a reference plane RP including the dihedral angles LA of the paired first protrusions 11a and 11b to the dihedral angle LA of each of the third protrusions 13a and 13b in a direction perpendicular to the reference plane RP is smaller as compared with a distance from the reference plane RP to the dihedral angle LA of the second protrusion 12 in the direction perpendicular to the reference plane RP by a distance h. In addition, the distances from the reference plane RP to the dihedral angles LA of the respective third protrusions 13a and 13b in the direction perpendicular to the reference plane RP are the same.

Figure 4:
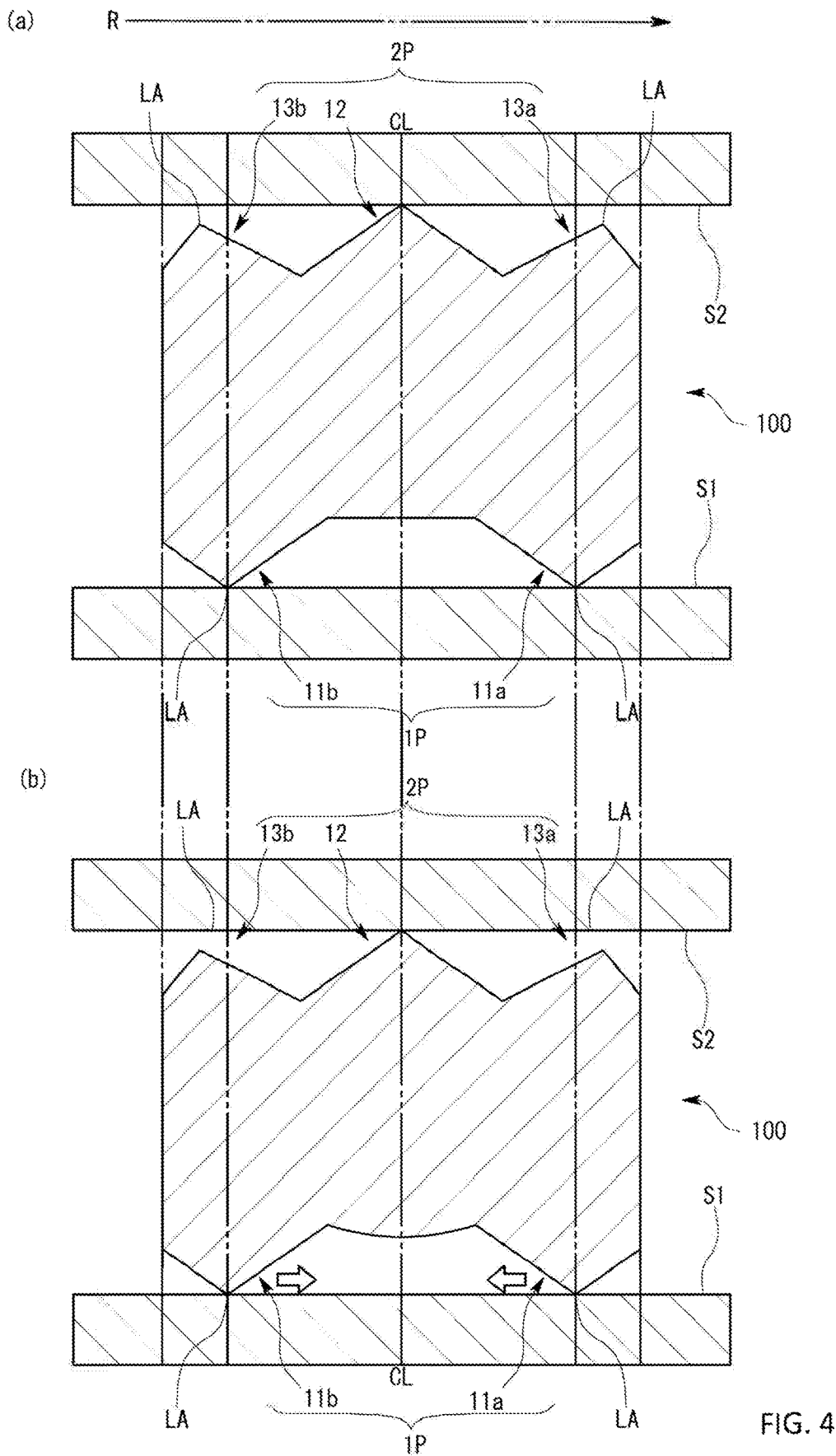
FIG. 4 is a schematic cross-sectional view illustrating a natural state before deformation of the metal seal according to the first embodiment at the start of pressing and a state after completion of sandwiching and pressing.

Accordingly, as illustrated in FIG. 4 at (a), at the point in time when sandwiching and pressing are started with the first flat surface S1 in contact with the first end surface part 1P and the second flat surface S2 in contact with the second end surface part 2P, only the dihedral angle LA of the second protrusion 12 is in contact with the second flat surface S2, and the dihedral angles L1 of the respective third protrusions 13a and 13b are not in contact the second flat surface S2. In addition, the dihedral angles LA of the respective third protrusions 13a and 13b are arranged at the same height as viewed from the first flat surface S1.

Further, when cutting the metal seal 100 along the central axis Z, the dihedral angles LA of the paired first protrusions 11a and 11b, the dihedral angle LA of the second protrusion 12, and the dihedral angles LA of the paired third protrusions 13a and 13b appear on mutually different planes. In addition, the dihedral angles LA of the respective first protrusions 11a and 11b appear on the same plane, and the dihedral angles LA of the respective third protrusions 13a and 13b also appear on the same plane. Further, the metal seal 100 is an annular body having a uniform cross-sectional shape, and is therefore configured so that when viewing two arbitrary end surfaces appearing on one or two cross sections including the central axis Z as illustrated in FIG. 2, the two dihedral angles LA of the first protrusions 11a and 11b appearing on each of the end surfaces are arranged on the same plane, and the two dihedral angles LA of the third protrusions 13a and 13b appearing on each of the end surfaces are arranged on the same plane. In addition, the plane on which the dihedral angles LA of the respective first protrusions 11a and 11b appearing on each of the end surfaces are arranged and the plane on which the dihedral angles LA of the respective third protrusions 13a and 13b appearing on each of the end surfaces are arranged are configured to be parallel to each other.

Because of the configuration as described above, as illustrated in FIG. 3, the paired first protrusions 11a and 11b, the second protrusion 12, and the paired third protrusions 13a and 13b are configured to extend from the reference plane RP in the perpendicular direction and be line-symmetric with respect to the centerline CL passing through the dihedral angle LA of the second protrusion 12.

Next, the case where the metal seal 100 is sandwiched pressed by the first flat surface S1 and the second flat surface S2 will be described on the basis of FIG. 4.

As illustrated in FIG. 4 at (a), in the natural state before deformation of the metal seal 100, and at the point in time when the pressing is started with the first flat surface S1 in contact with the first end surface part 1P and the second flat surface S2 in contact with the second end surface part 2P, the metal seal 100 is in a first state where the dihedral angles LA of the paired first protrusions 11a and 11b are in contact with the first flat surface S1, and the dihedral angle LA of the second protrusion 12 is in contact with the second flat surface S2.

Then, when further bringing the first flat surface S1 and the second flat surface S2 close to each other after coming into the first state, as illustrated in FIG. 4 at (b), the first flat surface S1 and the second flat surface S2 start to press the metal seal 100, and as a result, the metal seal 100 is deformed and brought into a second state where in addition to the dihedral angle LA of the second protrusion 12, the dihedral angles LA of the paired third protrusions 13a and 13b are also in contact with the second flat surface S2. More specifically, when pressing the metal seal 100 is started, the metal seal 100 is deformed from the natural state such that the paired third protrusions 13a and 13b slightly move toward the centerline CL side, and as a result, the dihedral angles LA of the paired third protrusions 13a and 13b come into contact with the second flat surface S2 in a state of being slightly closer to the centerline CL side as compared with the natural state. Note that the movements of the third protrusions 13a and 13b toward the centerline CL side are slight, and in the state (second state) where the paired third protrusions 13a and 13b are in contact with the second flat surface S2, the state where the one third protrusion 13a is arranged on the outer side of the one first protrusion 11a and the other third protrusion 13b is arranged on the inner side of the other first protrusion 11b in the radial direction R is kept.

In addition, at the point in time when the pressing is started, the dihedral angles LA of the paired first protrusions 11a and 11b are in contact with the first flat surface S1, and therefore bite into the first flat surface S1 to serve as wedges. Similarly, the dihedral angle LA of the second protrusion 12 is in contact with the second flat surface S2, and therefore bites into the second flat surface S2 to serve as a wedge. As a result, even when the metal seal 100 is deformed by the pressing, the paired first protrusions 11a and 11b and the second protrusion 12 are hardly displaced from their original contact positions. In this case, although FIG. 4 illustrates the respective dihedral angles LA of the paired first protrusions 11a and 11b and second protrusion 12 in horn shapes whose tips are pointed, the tips of the horn shapes may be crushed because of a problem in the strength of the metal seal 100, and the horn shapes may be deformed into a shape that is not a horn shape, such as a flat shape or an arc shape.

Subsequently, when further bringing the first flat surface S1 and the second flat surface S2 close to each other after coming into the second state, the dihedral angles LA of the paired third protrusions 13a and 13b bite into the second flat surface S2. In this case, in the radial direction R, a position at which the dihedral angle LA of the second protrusion 12 contacts with the second flat plane S2 is on the inner side than a position at which the dihedral angle LA of the one first protrusion 11a contacts with the first flat surface S1, whereas a position at which the dihedral angle LA of the one third protrusion 13a contact with the second flat surface S2 is on the outer side. As a result, the direction of stress generated when the one first protrusion 11a and the second protrusion 12 are pressed and the direction of stress generated when the one first protrusion 11a and the one third protrusion 13a are pressed become opposite. This allows the one third protrusion 13a to be suppressed from sliding on the second flat surface S2, and consequently, the dihedral angle LA of the one third protrusion 13a is hardly displaced from its original contact position with the second flat surface S2. In addition, the same holds true for the relationship among the other first protrusion 11b, the second protrusion, and the other third protrusion 13b, except that a positional relationship in the radial direction R is reversed.

Incidentally, when the first flat surface S1 and the second flat surface S2 start to press the metal seal 100, the respective dihedral angles LA of the paired first protrusions 11a and 11b, second protrusion 12, and paired third protrusions 13a and 13b may be crushed because of the problem in the strength of the metal seal 100, and the tips of them may be deformed into a shape that is not a horn shape, such as a flat shape or an arc shape.

Also, depths to which the dihedral angles LA of the paired first protrusions 11a and 11b bite into the first flat surface S1 during a period from the first state to the second state, in other words, during a period from when pressing the metal seal 100 is started to when the dihedral angles LA of the paired third protrusions 13a and 13b contact with the second flat surface S2 are shallow as compared with a depth to which the dihedral angle LA of the second protrusion 12 bites into the second flat surface S2. This is because the two dihedral angles LA are in contact with the first flat surface S1, whereas only the one dihedral angle is in contact with the second flat surface S2, and therefore contact area is different. However, when further continuing the pressing after coming into the second state, pressing force by the second flat surface S2 becomes efficiently transmitted to the paired first protrusions 11a and 11b via the paired third protrusions 13a and 13b, and consequently, the dihedral angles LA of the paired first protrusions 11a and 11b more deeply bite into the first flat surface S1. As a result, even when the deformation of the metal seal 100 is increased, the dihedral angles LA of the paired first protrusions 11a and 11b correspondingly more deeply bite into the first flat surface S1, so that the pair is suppressed from slipping on the first flat surface S1, and therefore the paired first protrusions 11a and 11b are hardly displaced from their original contact positions with the first flat surface S1.

Therefore, the metal seal 100 according to the first embodiment can prevent fine scratches from being easily produced on the first flat surface S1 and the second flat surface S2 by slipping of the metal seal 100 due to further sandwiching and pressing, as well as prevent wrinkles from being easily produced therein, and as a result, microvoids causing fluid leakage is not easily produced.

Also, in such a configuration, since even when the metal seal 100 is sandwiched pressed by the first flat surface S1 and the second flat surface S2, the contact position of each protrusion with a corresponding flat surface is not displaced, large torsion does not occur in the pressing direction (direction along the centerline CL). For this reason, even after the metal seal 100 has been sandwiched pressed by the first flat surface S1 and the second flat surface S2, the metal seal 100 keeps restoring force in the pressing direction. As a result, even when a situation where the distance between the first flat surface S1 and the second flat surface S2 is increased to some extent for some reason occurs, sealability can be kept.

Accordingly, the metal seal 100 according to the first embodiment can be uniformly pressed by the first flat surface S1 and the second flat surface S2 to thereby achieve high close contact performance over the entire circumference, thus making it possible to improve sealability and prevent fluid leakage.

Second Embodiment

Figure 5:
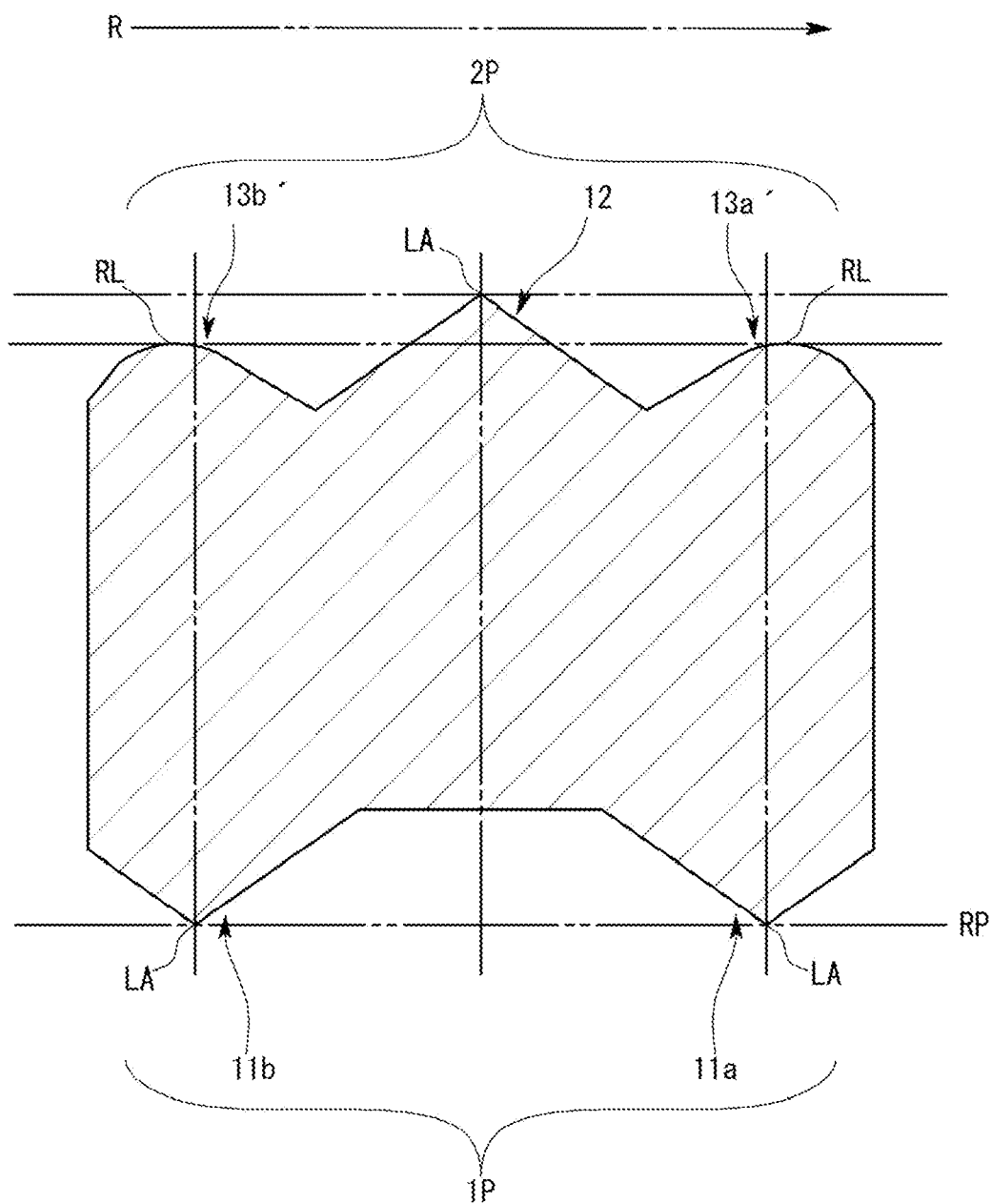
FIG. 5 is a schematic cross-sectional view illustrating a cross section along a radial direction of a metal seal according to a second embodiment.
Figure 6:
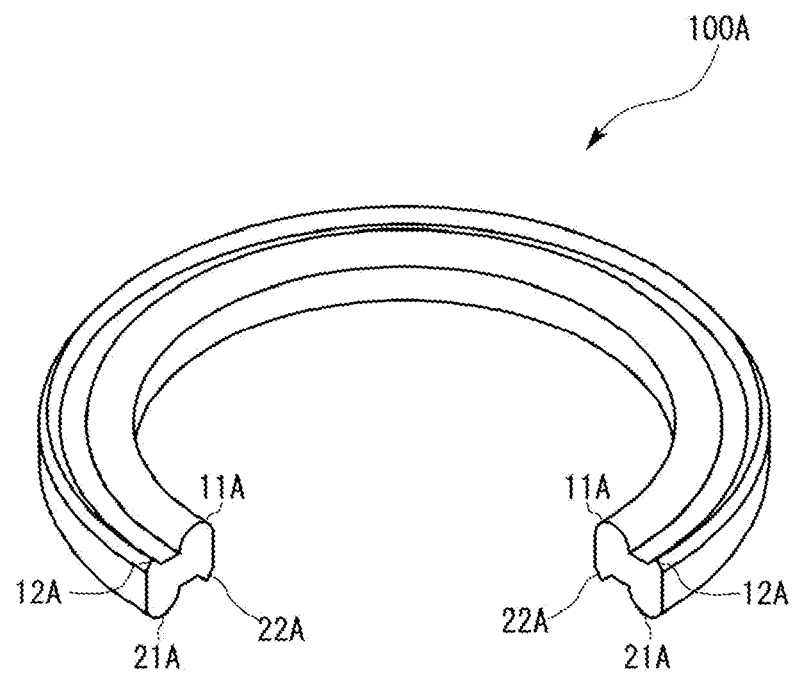
FIG. 6 is a schematic perspective view illustrating a conventional metal seal.
Figure 7:
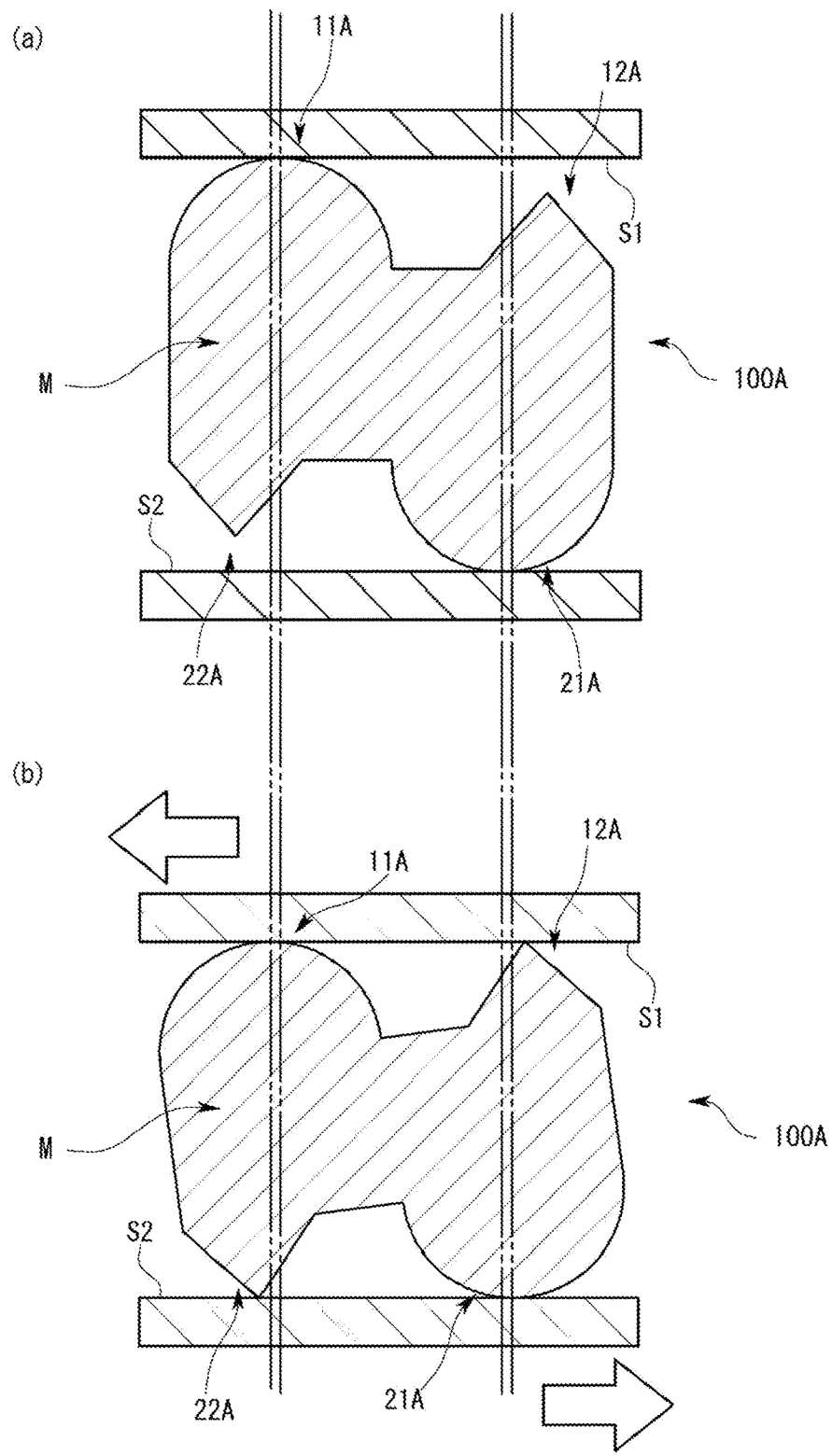
FIG. 7 is a schematic cross-sectional view illustrating a natural state before deformation of the conventional metal seal at the start of pressing and a state after completion of sandwiching and pressing.
Figure 8A:
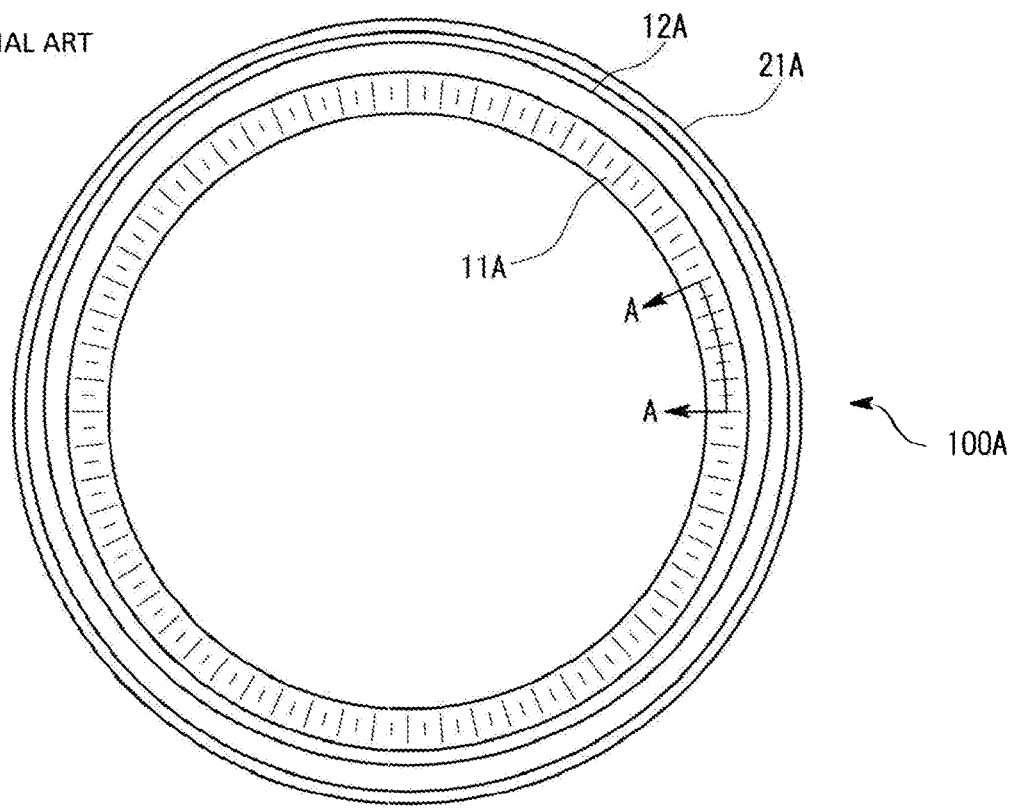
FIGS. 8(a) and 8(b) are schematic views illustrating a wrinkle production state after completion of sandwiching and pressing in the conventional metal seal.
Figure 8B:
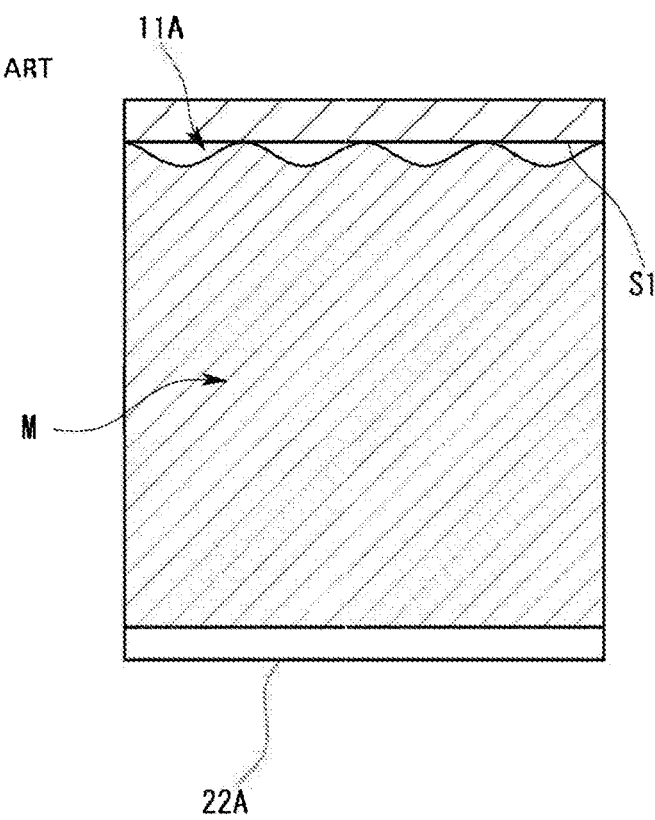

The present embodiment is a variation of the second end surface part 2P of the metal seal 100 according to the first embodiment, and specifically a variation of the paired third protrusions 13a and 13b formed on the second end surface part 2P. As illustrated in FIG. 5, a metal seal 100 according to the present embodiment is such that paired third protrusions 13a' and 13b' are ones whose cross sections along the radial direction are of a substantially partial cylindrical shape. In addition, in the metal seal 100 according to the present embodiment, parts of the paired third protrusions 13a' and 13b' to which distances from the reference plane RP in the direction perpendicular to the reference plane are the maximum form ridge lines RL, and contact with the second flat surface S2.

In such a configuration, it is not expected that the ridge lines RL of the paired third protrusions 13a' and 13b' bite into the second flat surface S2 as with the dihedral angles of the paired third protrusions 13a and 13b according to the first embodiment. However, as with the metal seal 100 according to the first embodiment, this configuration improves sealability.

Other Embodiments

The metal seal according to the present invention is not one used only for mass flow controllers, but can also be used for other applications. For example, the metal seal may be used for fluid control equipment such as a pressure control apparatus, or for the fitting part between pipes through which fluid flows.

In each of the above-described embodiments, the paired first protrusions are line-symmetrically arranged with respect to the central axis, and also the paired third protrusions are line-symmetrically arranged with respect to the central axis, but the arrangements are not limited to them. For example, only at least ones of the paired first protrusions and the paired third protrusions may be line-symmetrically arranged with respect to the central axis.

Further, in each of the above-described embodiments, the shapes of the paired first protrusions are line-symmetric shapes with respect to the central axis, but can also be non-symmetric shapes. Similarly, the shapes of the paired third protrusions can also be non-symmetric shapes. However, in this case, imbalances in external force and stress occur between both sides of the central axis, and therefore line-symmetric shapes are preferable.

Also, the metal seal according to the present invention only has to be an annular one, but is not limited to a substantially perfect circular shape as viewed from the direction perpendicular to the first end surface part or the second end surface part as in each of the above-described embodiments. For example, as viewed from the direction perpendicular to the first end surface part or the second end surface part, the metal seal may be formed in various annular shapes such as an elliptical shape, a rounded-corner quadrangular shape, and a track shape. In the case of a shape other than a perfect circular shape, the central axis in the above-described embodiments can be defined as a reference axis. Also, the metal seal is preferably formed as a uniform cross-sectionally shaped annular body whose cross-sectional shape in an extending direction is almost the same shape on any cross sections.

Besides, it goes without saying that the present invention is not limited to any of the above-described embodiments, but can be variously modified without departing from the scope thereof.

LIST OF REFERENCE CHARACTERS

100: Metal seal
200: Fluid control apparatus
1P: First end surface part
2P: Second end surface part
S1: First flat surface
S2: Second flat surface
11a, 11b: First protrusion
12: Second protrusion
13a, 13b: Third protrusion

The invention claimed is:

1. A metal seal that is annular, provided between a first flat surface and a second flat surface, and sandwiched pressed by bringing the first flat surface and the second flat surface close to each other, the metal seal comprising:
 a first end surface part opposite to the first flat surface; and
 a second end surface part opposite to the second flat surface, wherein
 the first end surface part comprises
  paired first protrusions that are formed displaced in a radial direction of the metal seal and have dihedral angles in contact with the first flat surface, and
 the second end surface part comprises:
  a second protrusion that is formed on a radially inner side of one of the first protrusions and on a radially outer side of the other first protrusion in the radial direction, and has a dihedral angle in contact with the second flat surface; and
  paired third protrusions that are respectively formed on a radially inner side and a radially outer side of the second protrusion in the radial direction and whose highest points to which distances from a reference plane including the dihedral angles of the paired first protrusions in a direction perpendicular to the reference plane are shorter than a distance from the reference plane to the dihedral angle of the second protrusion in the direction perpendicular to the reference plane.

2. The metal seal according to claim 1, wherein when the metal seal is sandwiched pressed and deformed by the first flat surface and the second flat surface, the paired third protrusions contact with the second flat surface.

3. The metal seal according to claim 1, wherein when the metal seal is sandwiched pressed and deformed by the first flat surface and the second flat surface,
 one of the third protrusions contacts with the second flat surface on a radially outer side of the one first protrusion in the radial direction, and
 the other third protrusion contacts with the second flat surface on a radially inner side of the other first protrusion in the radial direction.

4. The metal seal according to claim 1, wherein at least ones of the paired first protrusions and the paired third protrusions extend in the direction perpendicular to the reference plane, and are line-symmetrically formed with respect to a centerline passing through the dihedral angle of the second protrusion.

5. The metal seal according to claim 1, wherein the paired third protrusions have dihedral angles to be in contact with the second flat surface.

6. The metal seal according to claim 5, wherein the dihedral angles of the paired third protrusions are formed so as to have a same distance from the reference plane in the direction perpendicular to the reference plane.

7. A fluid control apparatus comprising:

the metal seal according to claim 1;

a flange formed with the first flat surface; and a block formed with the second flat surface, wherein the metal seal is configured to be sandwiched pressed by the first flat surface and the second flat surface by mounting the flange on the block.

8. A metal seal that is annular and comprises a first end surface part and a second end surface part, wherein the first end surface part comprises paired first protrusions that are formed displaced in a radial direction of the metal seal and have dihedral angles, and the second end surface part comprises:

a second protrusion that is formed on a radially inner side of one of the first protrusions and on a radially outer side of the other first protrusion in the radial direction, and has a dihedral angle; and paired third protrusions that are respectively formed on a radially inner side and a radially outer side of the second protrusion in the radial direction and whose highest points to which distances from a reference plane including the dihedral angles of the paired first protrusions in a direction perpendicular to the reference plane are shorter than a distance from the reference plane to the dihedral angle of the second protrusion in the direction perpendicular to the reference plane.

9. A sealing method using the metal seal of claim 1 that is annular and comprises the first end surface part including the paired first protrusions having the dihedral angles and the second end surface part including the second protrusion having the dihedral angle and the paired third protrusions having ridge lines, the sealing method comprising:

bringing the dihedral angles of the paired first protrusions into contact with the first flat surface, as well as bringing the dihedral angle of the second protrusion into contact with the second flat surface; and bringing the ridge lines of the paired third protrusions into contact with the second flat surface by sandwiching, pressing, and deforming the metal seal by the first flat surface and the second flat surface.

* * * * *